United States Patent [19]

Carter et al.

[11] Patent Number: 4,636,185

[45] Date of Patent: Jan. 13, 1987

[54] APPARATUS FOR FABRICATING A BOX-LIKE ARTICLE

[75] Inventors: Leewood C. Carter; Robin P. Neary, both of Warren, N.J.; Robert Mullen, North Andover, Mass.

[73] Assignee: Book Covers Inc., Newark, N.J.

[21] Appl. No.: 731,355

[22] Filed: May 7, 1985

[51] Int. Cl.[4] .................... F16H 7/22

[52] U.S. Cl. .................... 493/127; 493/151; 493/176

[58] Field of Search .................... 493/23, 111, 113, 114, 493/127, 133, 151, 437, 453, 176, 178, 179; 53/563

[56] References Cited

U.S. PATENT DOCUMENTS 1,341,954 6/1920 Weightman et al. .............. 493/111

3,589,097 6/1971 Glianese .............. 493/910

*Primary Examiner*—Francis S. Husar

*Assistant Examiner*—Robert Showalter

*Attorney, Agent, or Firm*—Ezra Sutton

[57] ABSTRACT

The invention features an apparatus for fabricating a box-like article or slipcase. The apparatus feeds a box blank from a hopper containing stacked blanks to a work station. The work station comprises a forming block about which the panels of the box blank are folded and bonded together, and clamping, folding and heating apparatus. The complete box is removed from the forming block and conveyed away which causes the fabricating cycle to process a new blank into a box-like article.

19 Claims, 10 Drawing Figures

APPARATUS FOR FABRICATING A BOX-LIKE ARTICLE

FIELD OF THE INVENTION

The invention relates to an apparatus for the manufacture of a box-like article, and more particularly, to an automatic machine for performing the folding and bonding steps on a box blank in a box fabricating process to form what is known in the art as a slipcase.

BACKGROUND OF THE INVENTION

In copending U.S. patent application Ser. No. 730,722, filed May 6, 1985, and assigned to a common assignee, a box-like article is disclosed in which the box or slipcase is formed from a paperboard blank and a backing material in a number of sequential folding and gluing steps. The present invention features a machine whereby the blank described in the aforementioned application is automatically formed into a slipcase in the same sequence of operations. For the sake of brevity, the disclosure of the above-mentioned application is incorporated herein by way of reference. Generally, a slipcase is rectangular in shape having an opening on one side thereof, and is formed from a paperboard frame covered over by a backing or finishing material, such as cloth. The cloth is coated with a heat-sensitive adhesive which allows the backing material to be adhered to the paperboard by the application of heat using a heating element. Alternatively, the backing material has wet glue and is bonded to the paperboard by the application of pressure without heat. The slipcase is adapted to receive or have slipped into it books and the like.

In prior art methods, there have been problems of slipcases formed with misaligned printing thereon, and such slipcases are unacceptable in use. In such methods, the backing material is printed on before it is adhered to the paperboard blank. The blank and backing are then folded and glued to form the slipcase. In many cases, if the backing material is not adhered to the paperboard blank at exactly the right angle, then the printed matter is misaligned on the resulting slipcase. This problem is accentuated by the fact that when a book with printed matter thereon is placed in the slipcase, the printed matter on the spine of the book is not in alignment with the printed matter on the slipcase.

One of the advantages of the present invention is that it eliminates such problems, since it allows the backing material to be printed on after it is adhered to the paperboard blank, and this avoids the printing misalignment problems discussed above. As explained herein, the use of a heat-sensitive adhesive on the backing material for assembling the slipcase, as compared to wet glue, does not interfere with the printing operation being performed after the backing is adhered to the paperboard blank.

BRIEF SUMMARY OF THE INVENTION

The invention pertains to an apparatus for fabricating a finished box article or slipcase from a box blank comprising a top panel, a bottom panel and three side panels, all adhered to a backing material which includes side flaps and corner tabs to be adhered to the side panels after they are folded into position.

The apparatus comprises means to feed a plurality of blanks from a hopper one at a time to a conveyor. The conveyor transports each blank in a flat or planar form to a work station having a forming block about which each panel of the blank will be folded to form the box article. The bottom panel of each blank is first moved under the forming block and is clamped by a bottom clamping plate to the bottom of the forming block, while the top panel is folded from its planar form and onto the top of the block by a pair of vertically movable rollers. The top panel is then clamped in place by an upper clamping arm. A pair of side clamping arms then engage and fold the side panels into engagement with the side walls of the forming block.

Two movable arms having V-shaped heating elements next engage, fold and heat the adhesive of the corner tabs of the backing material in order to affix the tabs to the respective folded side panels to hold them in place. Then, two side heating plates engage, fold and heat the adhesive of the side flaps of the backing material, causing the side flaps to adhere to the respective folded tabs and side panels, whereby a finished box article is fabricated. A movable arm then retracts the forming block from the work station so that the forming block is withdrawn from within the finished box, and the box drops onto a take-away conveyor.

A programmed system electrically actuates the various feeding, clamping, folding, bonding and removing elements in a predetermined time sequence. As the finished box is separated from the forming block, a limit switch is tripped to start the fabricating cycle all over again for the next box blank.

It is an object of the invention to provide an improved apparatus for fabricating a box-like article in the form of a slipcase.

It is another object of this invention to provide an automatic machine for feeding, clamping, folding and adhering panels of a box blank in order to form a finished box article and which avoids printing misalignment problems of the past.

These and other objects of the invention will be better understood and will become more apparent with reference to the subsequent detailed description considered in conjunction with the accompanying drawings.

BRIEF DESCRIPTION OF THE DRAWINGS

FIGS. 2 through 8*c* are schematic perspective views of portions of the apparatus illustrating various operational steps for fabricating a box using the apparatus of FIG. 1.

FIG. 2 is a view of an initial operational step wherein a flat box blank having the backing already adhered thereto is supplied to the forming block and the bottom panel is clamped in place.

FIG. 3 is a view wherein the intermediate side panel and top panel of the blank shown in FIG. 2 are moved from their planar orientation and are folded over the forming block into engagement with a sidewall and top wall of the forming block.

FIG. 4 depicts a view wherein two of the side panels of the blank are folded down and into engagement with the sidewalls of the forming block.

FIG. 5 illustrates a view wherein the corner tabs of the backing material are folded over and glued to the folded side panels of the blank.

FIG. 6 is a view wherein the side flaps of the backing material are folded upwardly and glued to the folded side panels of the blank.

FIG. 7 is a view wherein all the clamps are removed from the completed slipcase, and FIGS. 8a through 8c illustrate sequential side views of operational steps for removing the completed box from the forming block; FIG. 8a depicts the box and forming block being drawn towards an abutment; FIG. 8b shows the box contacting the abutment; and FIG. 8c illustrates the forming block being withdrawn from the completed slipcase.

DETAILED DESCRIPTION OF THE INVENTION

The invention features an apparatus for fabricating a box-like article or slipcase. Generally, the apparatus has a hopper for receiving and stacking a plurality of box blanks which are then fed one at a time to a conveyor, which in turn, feeds each individual blank to a work station. At the work station the blank is clamped and folded about a forming block in a number of sequential steps. When the blank is completely folded to form the box shape, means are provided for folding and adhering corner tabs and side flaps of the backing material to the box blank to hold the panels in place. After the box article is completed, the box is removed from the forming block, and a new blank is fed to the work station to begin a new fabrication cycle.

In the following description, like elements have the same numerical designations throughout.

Figure 1:
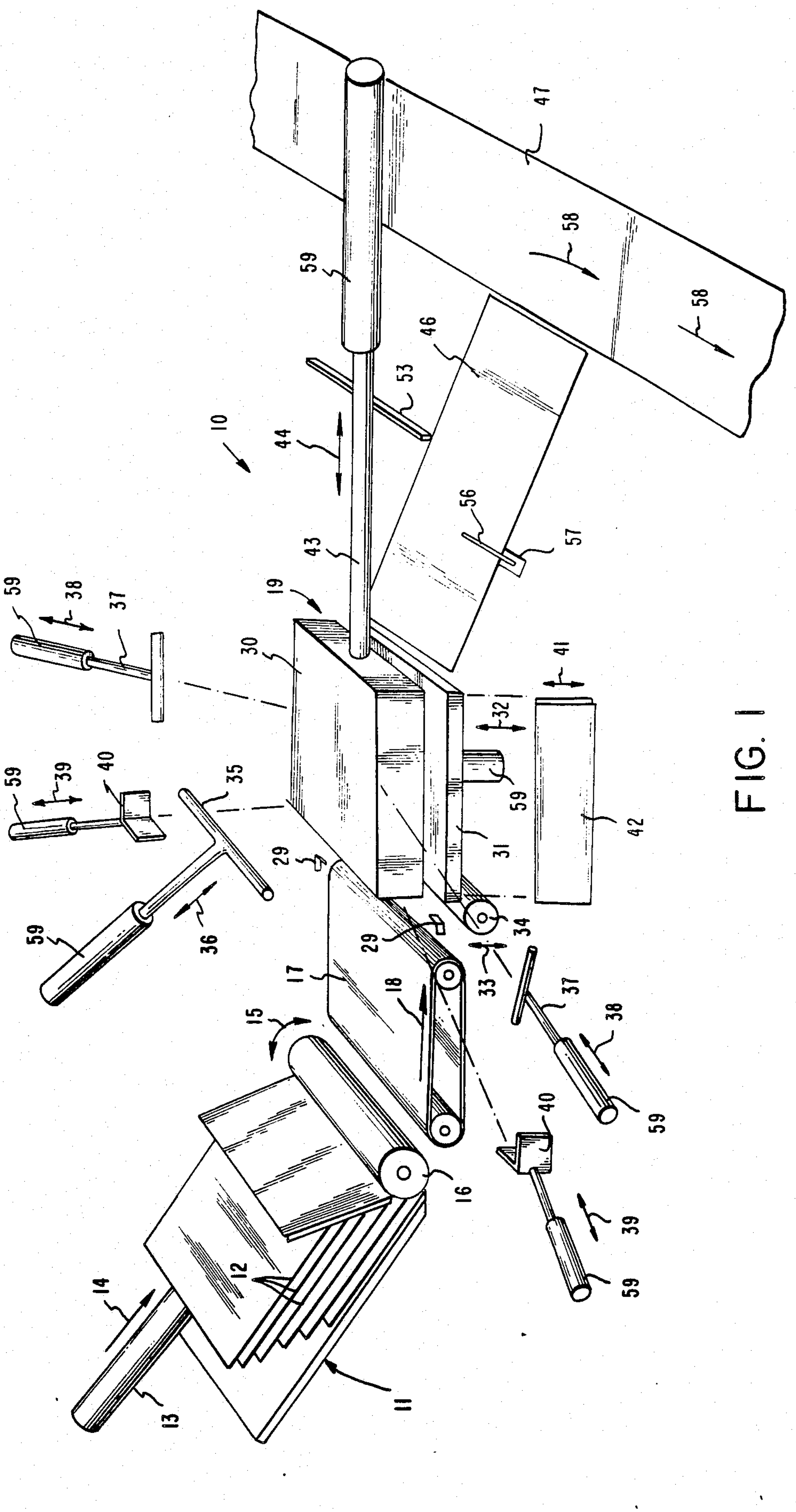
FIG. 1 is a schematic perspective view of the overall apparatus of this invention, for fabricating a box-like article.

Now referring to FIG. 1, the apparatus 10 of this invention is shown in a schematic perspective view. A hopper 11 holds a plurality of box blanks 12 stacked one on top of the other. A feeding system is provided which includes an infeed pusher rod 13 which pushes (arrow 14) one blank 12 at a time from the bottom of the stack to the nip of a rotating (arrow 15) roller 16, which in turn deposits the blank 12 upon a conveyor belt 17. The conveyor belt 17 transports (arrow 18) the blank 12 to a work station generally depicted by arrow 19.

Work station 19 is provided with apparatus for clamping and folding the top, bottom, and side panels of the box blank, and for folding and adhering the corner tabs and side flaps of the backing material over the folded box blank to complete the formation of box article. The apparatus includes: a forming block 30 about which the blank 12 is folded; a bottom clamping plate 31, which moves vertically upward and downward (arrows 32) to engage and disengage the bottom panel 22 of blank 12 with the bottom surface of forming block 30 (FIG. 2); a vertically movable (arrows 33) roller 34 for folding over the intermediate side panel 21 and top panel 20, respectively, about block 30 (FIG. 3); an upper clamping arm 35 that moves diagonally (arrows 36) to fold and clamp the top panel 20 of blank 12 to the top surface of block 30 (FIG. 3); two side clamping arms 37 that move diagonally (arrows 38) to fold down the side panels 23 and 24, respectively, about the side walls of block 30 (FIG. 4); two diagonally movable (arrows 39) V-shaped folding and heating elements 40 for folding and adhering corner tabs 25 and 26, respectively, over the folded side panels 23 and 24, respectively (FIG. 5); two vertically movable (arrows 41) side heating plates 42 for upwardly folding and adhering the side flaps 27 and 28, respectively, over the side panels 23 and 24, respectively, and side pressure clamps 51 for engaging and holding side heating plates 42 tightly in contact with the sidewalls of the box (FIG. 6); forming block arm 43 which moves horizontally (arrows 44) to withdraw the block 30 from the completed box article 45 (FIGS. 8a through 8c); and a conveyor slide 46 and a conveyor belt 47 for conveying the finished box article 45 from the work station 19. These elements and their operation will now be explained in greater detail.

Figure 2:
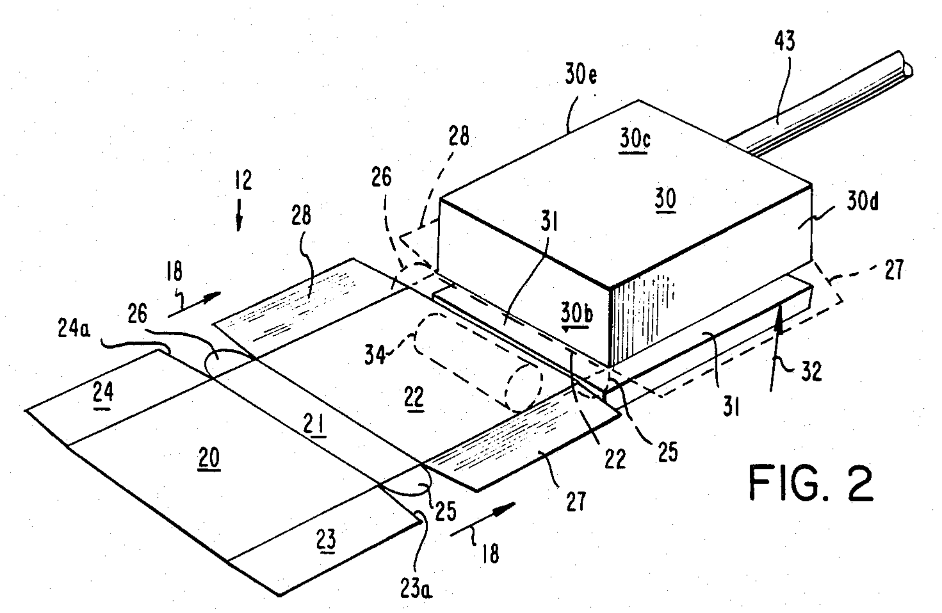

Referring now specifically to FIG. 2, the box blank 12 is shown as it is supplied by conveyor 17 (arrow 18) toward forming block 30. The blank 12 is comprised of a top panel 20; intermediate side panel 21; bottom panel 22; two side panels 23 and 24 all formed of paperboard; and a backing material glued to and overlapping the entire back surface of the paperboard blank, which also has two projecting corner tabs 25 and 26; and two projecting side flaps 27 and 28, for a purpose to be explained. Preferably, the backing material is formed of cloth and coated with a heat-sensitive adhesive. Of course, other suitable backing materials may be employed, such as paper, non-woven cloth, and vinyl.

Figure 3:
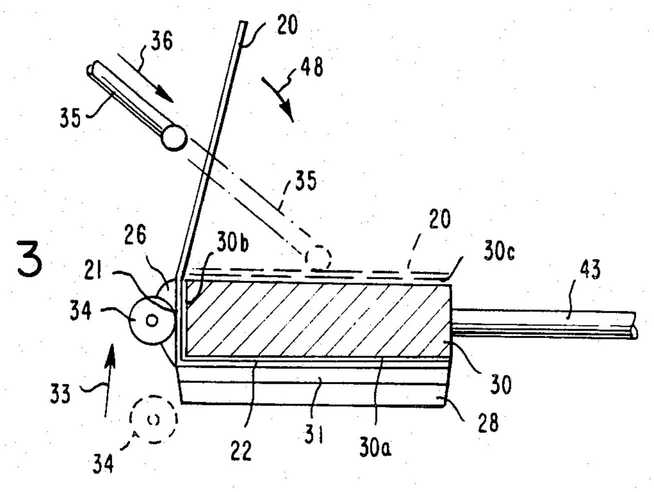

During the sequential operation of apparatus 10, the bottom panel 22 of blank 12 is moved under the forming block 30, as shown in phantom. Mechanical stops 29, shown in FIG. 1 on both sides of conveyor 17, engage the edges 23a and 24a of side panels 23 and 24, respectively, to insure proper alignment of the bottom panel 22 of blank 12 with respect to forming block 30. After the bottom panel 22 is disposed under the forming block 30, and properly positioned, the bottom clamping plate 31 is actuated to move upwardly (arrow 32) to clamp the bottom panel 22 in place against the bottom surface 30a of the block 30. Roller 34, disposed below the blank 12, as shown in greater detail in FIG. 3, is also actuated to move vertically upward (arrow 33), thus engaging with, and rolling over, intermediate side panel 21 to engage it with side wall 30b of block 30. As roller 34 rolls over side panel 21, top panel 20 is caused to move from its planar orientation and bend forward as shown by arrow 48.

Next, upper clamping arm 35 is actuated to move diagonally forward (arrow 36) and to engage with top panel 20, thereby clamping top panel 20 in engagement with top surface 30c of forming block 30, as shown in phantom. Upper clamping arm 35 remains engaged in this position along with bottom clamping plate 31 (FIG. 2) until the box article 45 (FIG. 7) is completely formed. (Reference is made to the timing sequences set forth in Table I hereinafter).

Figure 4:
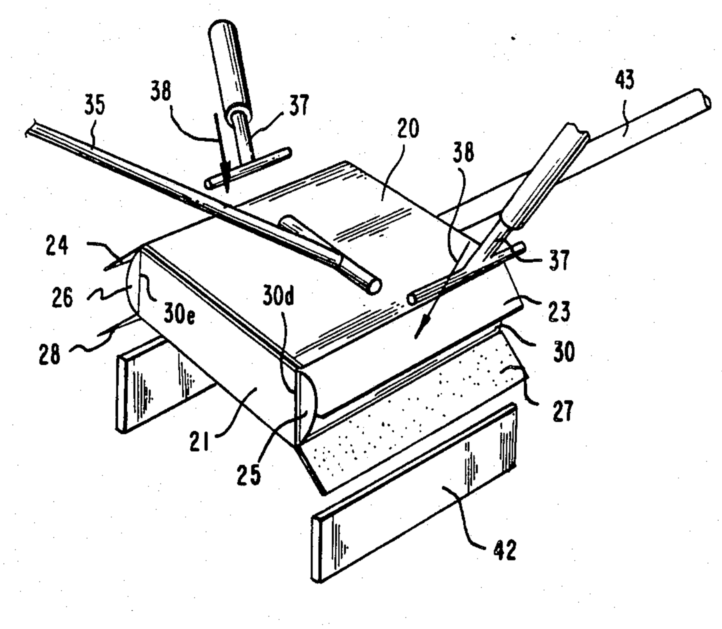

Referring to FIG. 4, the next operational step in the box fabrication comprises the diagonal movement (arrows 38) of both side clamping arms 37 which engage and fold down the side panels 23 and 24, respectively, against the side walls 30d and 30e of the forming block 30, as shown. At this point, the box is now formed into its desired configuration, having only one open side opposite intermediate side panel 21. It is only necessary to now glue the various panels together to maintain this configuration.

Figure 5:
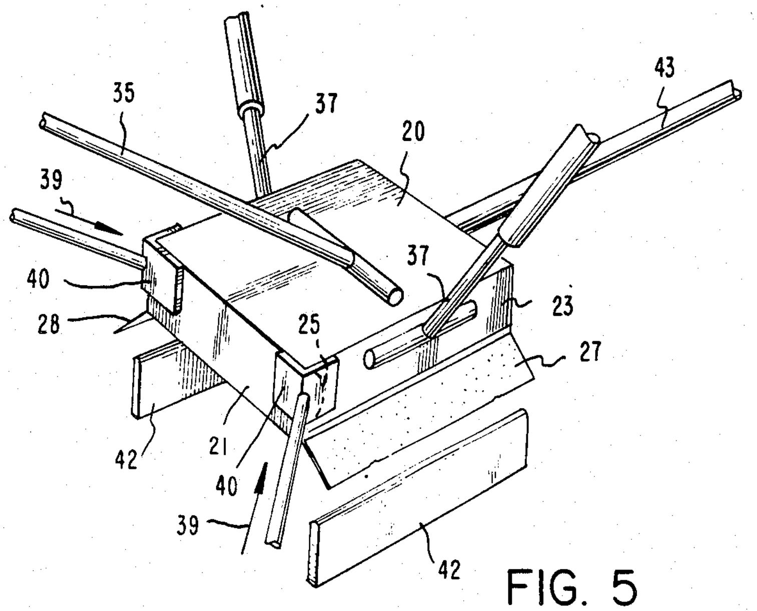

The next operation, as illustrated in FIG. 5, includes diagonal movement (arrows 39) of two V-shaped, corner flap folding and heating elements 40, which engage, fold and heat the corner tabs 25 and 26 of the backing material, respectively. The elements 40 are maintained at a temperature of 100° F., which has been found sufficient to heat and melt the glue coated on corner tabs 25 and 26, thus causing the corner tabs to adhere to side panels 23 and 24, respectively. The adherence of the corner tabs holds the folded side panels 23 and 24 in place, as well as panels 20, 21 and 22.

The V-shaped, folding and heating elements 40 are held in engagement with respective corner tabs 25 and 26 to allow the impregnated glue to flow, and are then retracted (the movement and holding duration of the V-shaped elements 40 is further detailed in Table I, below).

Figure 6:
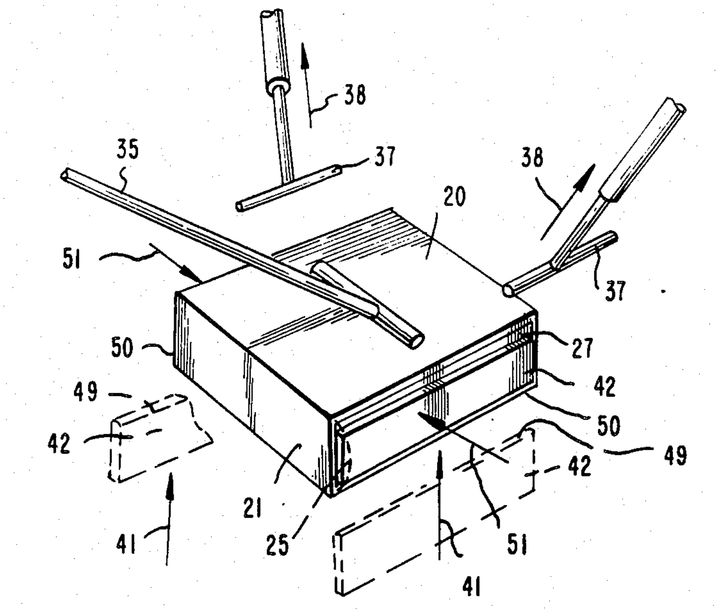

The box is now ready for the final fabricating step shown in FIG. 6. The final finishing step includes the folding and gluing of the backing material side flaps 27 and 28, respectively, over respective corner tabs 25 and 26, and side panels 23 and 24, respectively. This is accomplished by upward movement (arrows 41) of side heating plates 42 from a position below the forming block 30 (shown in phantom) to an upper engaging position shown in solid line.

When the upper edge 49 of side heating plates 42 contact and engage the lower edge 50 of the flaps 27 and 28 respectively, the side clamping arms 37 are withdrawn (arrows 38) to avoid interference. Side heating plates 42 maintain a temperature of 400° F., which is a sufficient temperature to heat, melt and cause the glue coated on side flaps 27 and 28 to adhere them respectively to side panels 23 and 24. Lateral pressure is also applied to side heating plates 42 when in their upper position, as shown by arrows 51, to insure good contact. This is accomplished by any suitable means, such as by using two movable clamps to apply the necessary pressure to side heating plates 42. After adhesion is achieved, side heating plates 42 and side pressure clamps 51 are retracted.

Figure 7:
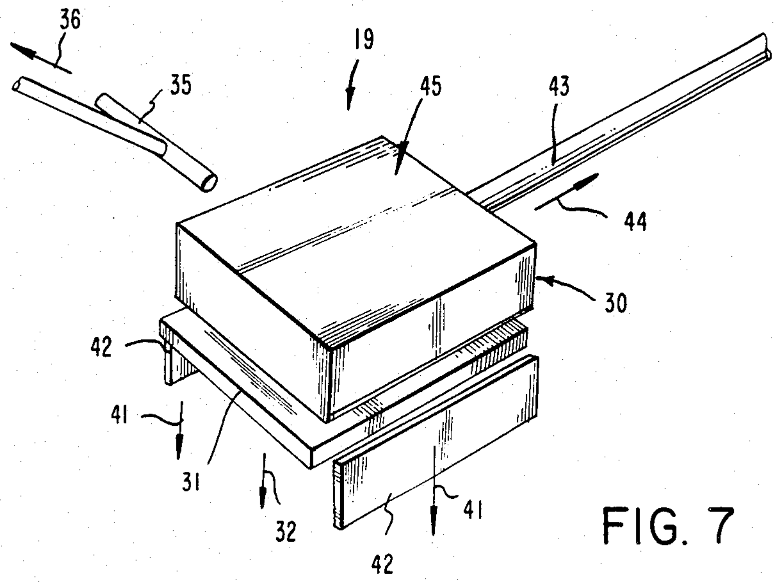
Figure 8A:
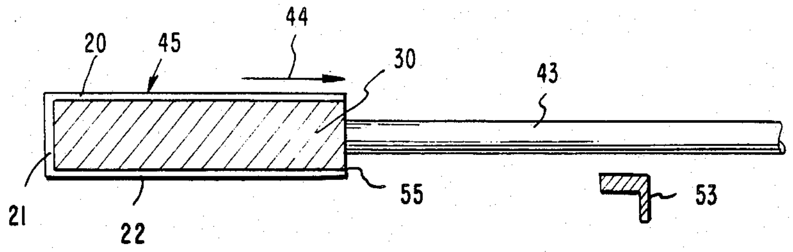
Figure 8B:
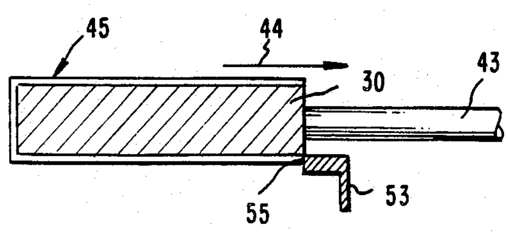
Figure 8C:
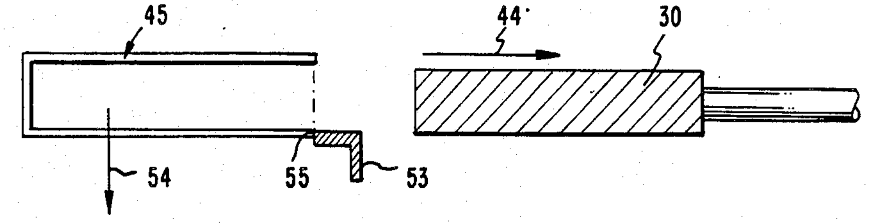

Referring now to FIGS. 7 and 8*a*, the finished box article 45 is shown formed about the forming block 30. Side heating plates 42 are retracted as shown by arrows 41, and the bottom clamping plate 31 is withdrawn (arrow 32) along with the upper clamping arm 35 (arrow 36). Forming block arm 43, attached to forming block 30, operates to remove (arrow 44) block 30 from work station 19, along with box article 45 which envelops forming block 30 (FIG. 8*a*). As the arm 43 and block 30 are being withdrawn, as shown in FIG. 8*b*, the lower edge 55 of the box 45 comes into contact with a flanged abutment 53 disposed below arm 43 (also see FIG. 1). Box 45 is stopped from further movement by abutment 53, but the forming block 30 continues to move and is completely removed from within box 45, as shown in FIG. 8*c*. The box 45 drops (arrow 54) onto a conveyor slide 46 (FIG. 1) when the forming block 30 is completely clear of the box as shown in FIG. 8*c*. The falling box 45 depresses a lever arm 56 of a limit switch 57 (FIG. 1) as it drops onto slide 46. The limit switch 57 sends a signal to a master control to start a new cycle, wherein the next blank 12 is fed from hopper 11, and arm 43 returns the forming block 30 to work station 19 to begin the next cycle. A moving conveyor 47 adjacent slide 46 transports (arrows 58) each finished box 45 to a storage area.

The various cylinders 59 actuating each clamp, roller, push rod or arm, can be pneumatically or electrically driven. Preferably each moving element is pneumatically driven. For this purpose, microprocessor WP6301, manufactured by the Western Pacific Timer Division of Minarik Electric Company, can be used to electrically actuate the feeding of air to the various pneumatic cylinders 59 and to control the sequence of operations.

The exact sequence and duration of each of the operational elements is listed below in Table I wherein OUTPUTS 0 to 8 correspond to the operational elements as follows:

OUTPUT 0—Feeding System including infeed pusher rod 14, roller 16, and conveyor 17.
OUTPUT 1—Vertically movable roller 34.
OUTPUT 2—Bottom clamping plate 31.
OUTPUT 3—Upper clamping arm 35.
OUTPUT 4—Side clamping arms 37.
OUTPUT 5—Corner flap folding and heating elements 40.
OUTPUT 6—Side heating plates 42.
OUTPUT 7—Retract forming block arm 43.
OUTPUT 8—Side pressure clamps 51.

TABLE I

| | | Outputs | | | | | | | | |
|---|---|---|---|---|---|---|---|---|---|---|
| Step | Function | 0 | 1 | 2 | 3 | 4 | 5 | 6 | 7 | 8 |
| 01 | 1FA-03 | | | | | | | | | |
| 02 | Go to 001 | | | | | | | | | |
| 03 | S00.25 | X | — | — | — | — | — | — | — | — |
| 04 | 1FC-06 | X | — | — | — | — | — | — | — | — |
| 05 | Go to 03 | X | — | — | — | — | — | — | — | — |
| 06 | S00.20 | — | X | — | — | — | — | — | — | — |
| 07 | S00.30 | — | X | X | — | — | — | — | — | — |
| 08 | S00.50 | — | X | X | X | — | — | — | — | — |
| 09 | S00.50 | — | X | X | X | X | — | — | — | — |
| 10 | S01.50 | — | X | X | X | X | X | — | — | — |
| 11 | S00.50 | — | X | X | X | X | — | — | — | — |
| 12 | S00.25 | — | X | X | X | X | — | X | — | — |
| 13 | S00.25 | — | X | X | X | — | — | X | — | — |
| 14 | S02.50 | — | X | X | X | — | — | X | — | X |
| 15 | S00.50 | — | X | X | X | — | — | X | — | — |
| 16 | S00.50 | — | X | X | X | — | — | — | — | — |
| 17 | S00.30 | — | X | X | — | — | — | — | — | — |
| 18 | S00.50 | — | — | — | — | — | — | — | — | — |
| 19 | S01.50 | — | — | — | — | — | — | — | X | — |
| 20 | 1FD-22 | — | — | — | — | — | — | — | X | — |
| 21 | Go to 19 | — | — | — | — | — | — | — | X | — |
| 22 | S01.65 | X | — | — | — | — | — | — | — | — |
| 23 | Go to 03 | — | — | — | — | — | — | — | — | — |

Having thus described the invention, what is desired to be protected by Letters Patent is presented by the following appended claims.

A latitude of modification, change and substitution is intended in the foregoing disclosure, and in some instances, some features of the invention may be employed without a corresponding use of other features. Accordingly, it is appropriate that the appended claims be construed broadly and in a manner consistent with the spirit and scope of the invention herein.

What is claimed is:

1. Apparatus for fabricating a finished box article from a box blank comprising a top panel, a bottom panel, an intermediate panel, and side panels, all of said panels being formed of paperboard and adhered to a backing material, said backing material including side flaps and corner tabs projecting beyond the edges of said bottom panel and said intermediate panel to be adhered to said side panels, said apparatus comprising:
- means for feeding said box blank to a work station;
- said work station including a forming block about which said box blank is folded to form said box article, clamping means disposed about said forming block for clamping said box blank to said forming block, folding means adjacent said forming block for folding said box blank about said forming block while being clamped by said clamping means, and sequential folding and heating means adjacent said forming block for folding and adhering said corner tabs and said side flaps to said folded side panels to hold said folded side panels in place;

said clamping means including means for engaging and clamping said top and bottom panels about said forming block; said clamping means further including means for moving said intermediate panel out of a coplanar relationship with said bottom panel and into engagement with a sidewall of said forming block;

said folding means including means for engaging and folding said side panels about the side walls of said forming block;

said sequential folding and heating means for said backing material including corner folding and heating elements for folding and adhering said corner tabs to said respective folded side panels;

said sequential folding and heating means further including side folding and heating elements for folding and adhering said side flaps to said respective folded side panels to complete the fabrication of said box article; and means adjacent said forming block for removing said completed box article from said forming block.

2. Apparatus in accordance with claim 1 wherein said feeding means includes hopper means for receiving and stacking a plurality of said box blanks, and means for supplying said box blanks from said hopper means one at a time to said work station.

3. Apparatus in accordance with claim 2 wherein said supplying means includes conveyor means for receiving said box blanks from said hopper means and conveying said box blanks one at a time to said work station.

4. Apparatus in accordance with claim 1 wherein said clamping means includes a first clamping element vertically movable for engaging and clamping said bottom panel to the bottom of said forming block, a second movable clamping element for engaging, moving and clamping said top panel to the top of said forming block, and a third clamping element vertically movable for engaging and clamping said intermediate panel to a sidewall of said forming block.

5. Apparatus in accordance with claim 1 wherein said folding means includes movable arms for engaging and folding said respective side panels about said forming block to engage the side walls of said forming block, said movable arms being retractable in response to movement of said side folding and heating elements.

6. Apparatus in accordance with claim 1, wherein said corner folding and heating elements include an arm at each of two corners of said work station, said arms each having a V-shaped folding and heating element at the end thereof for folding and adhering said corner tabs to said respective side panels.

7. Apparatus in accordance with claim 1 wherein said side folding and heating elements include vertically movable heated plates for folding and heating said side flaps to adhere them to said respective side panels.

8. An apparatus for fabricating a finished box article from a box blank comprised of paperboard panels adhered to a backing material, said panels including top, bottom, and side panels, said backing material including side flaps and corner tabs, said apparatus comprising:

means for feeding said box blank to a work station, said work station including a forming block about which said box blank can be folded to form said box article;

means disposed at said work station for clamping the top and bottom panels of said box blank to said forming block;

means disposed at said work station for folding at least two of said side panels of said box blank about said forming block to form a box shape having one open side;

means disposed at said work station for folding, heating and bonding portions of said backing material to said folded side panels to permanently hold said folded side panels in said box shape and to provide said box article with a finished appearance;

said means for folding, heating and bonding said backing material about said folded side panels including a pair of heated engaging arms for movingly engaging, folding, heating and adhering said corner tabs to said folded side panels; and means adjacent said forming block for removing said finished box article from said forming block and said work station.

9. The apparatus of claim 8, wherein said feeding means includes a hopper containing a plurality of stacked box blanks, and a conveyor leading from said hopper to said forming block for supplying one of said box blanks at a time under said forming block.

10. The apparatus of claim 8 wherein said clamping means further includes top and bottom clamps for clamping said top and bottom panels to said forming block.

11. The apparatus of claim 8, wherein said means for folding side panels of said box blank about said forming block includes a vertically movable element for folding a side panel of said box blank against said forming block.

12. The apparatus of claim 11, wherein said means for folding side panels of said box blank about said forming block further includes a pair of movable, side mounted engaging elements for folding side panels of said box blank about said forming block.

13. The apparatus of claim 8, wherein said folding and bonding means further includes vertically movable, side mounted engaging plates for folding and gluing the side flaps of said backing material over said corner tabs and over said folded side panels of said box blank.

14. The apparatus of claim 8, wherein said removing means includes a horizontally movable arm for withdrawing said forming block from within said finished box article.

15. The apparatus of claim 8, further including a programmed system for electrically actuating said feeding means, said clamping means, said folding means, said folding and bonding means and said removing means in a predetermined and sequential manner.

16. The apparatus of claim 8, wherein said engaging arms further include heating means for melting adhesive coated on said corner tabs to bond said corner tabs to said folded side panels.

17. The apparatus of claim 13, wherein said side mounted engaging plates include heating means for melting adhesive impregnated in said backing material to bond said side flaps to said corner tabs and said folded side panels.

18. The apparatus of claim 14, wherein said removing means further includes an abutment for engaging and preventing the box article from traveling with said forming block as said forming block is withdrawn by said horizontally movable arm.

19. Apparatus for fabricating a finished box article from a box blank comprising a top panel, a bottom panel, an intermediate panel, and side panels, all of said panels being formed of paperboard and attached to a backing material, said backing material including side flaps and corner tabs projecting beyond the edges of said paperboard to be attached to said side panels, said apparatus comprising:

a hopper for holding a stack of said box blanks;

conveyor means adjacent said hopper for feeding said box blanks from said hopper to a work station;

said work station including a forming block about which box blank is folded to form said box article, clamping means disposed about said forming block for clamping said bottom panel of said box blank to said forming block, upper folding means adjacent said forming block for folding said intermediate and top panels of said box blank into engagement with said forming block while said bottom panel is clamped by said clamping means, side folding means adjacent said forming block for folding said side panels into engagement with said forming block, and sequential folding and gluing means adjacent said forming block for folding and attaching said projecting corner tabs and side flaps to said folded side panels to hold said folded side panels in place;

said sequential folding and gluing means for said backing material including V-shaped corner folding and gluing elements for folding and attaching said corner tabs to said respective side panels;

said sequential folding and gluing means further including side folding and gluing plates for folding and attaching said side flaps to said respective side panels to complete the fabrication of said box article; and means adjacent said forming block for removing said completed box article from said forming block.

* * * * *